United States Patent [19]

Smith

[11] Patent Number: 5,016,275
[45] Date of Patent: May 14, 1991

[54] BUFFERED ENCRYPTION/DECRYPTION

[75] Inventor: Todd A. Smith, Austin, Tex.

[73] Assignee: International Business Machines Corporation, Armonk, N.Y.

[21] Appl. No.: 264,225

[22] Filed: Oct. 28, 1988

[51] Int. Cl.⁵ .............................................. H04L 9/18
[52] U.S. Cl. ........................................ 380/43; 380/9; 380/28; 380/50
[58] Field of Search ... 364/200 MS File, 900 MS File; 380/6, 9, 21, 28–30, 35, 36, 44, 46, 49, 50, 43

[56] References Cited

U.S. PATENT DOCUMENTS

| | | | |
|---|---|---|---|
| 2,995,624 | 8/1961 | Watters | 380/9 |
| 4,172,213 | 10/1979 | Barnes et al. | 380/29 |
| 4,471,164 | 9/1984 | Henry | 380/30 |
| 4,520,232 | 5/1985 | Wilson | 380/28 |
| 4,642,424 | 2/1987 | McNair | 380/48 |
| 4,802,217 | 1/1989 | Michener | 380/29 |

OTHER PUBLICATIONS

Carl H. Meyer and Stephen M. Matyas, *Cryptography: A New Dimension in Computer Data Security*, Chapter 2, pp. 53–61, John Wiley & Sons (New York 1982).

*Primary Examiner*—Stephen C. Buczinski
*Assistant Examiner*—Bernarr Earl Gregory
*Attorney, Agent, or Firm*—Douglas H. Lefeve

[57] ABSTRACT

Encryption and decryption mechanisms at transmitters and receivers, respectively, have applied thereto encryption or decryption keys and initializing values. These mechanisms generate cryptographic bit streams which are intermediate streams of generated values. These intermediate streams, generated prior to their real time need in the encryption or decryption processes, are stored in buffers until data is presented for encryption or decryption, at which time the cryptographic bit streams are conveyed from the buffers to mathematical functions, for combination with the data. This avoids the delays associated with the real time generation of the cryptographic bit streams during the encryption and decryption processes. Appropriate synchronization of the generation and buffer storage of the cryptographic bit streams at the transmitter and receiver is provided.

12 Claims, 5 Drawing Sheets

PRIOR ART

BUFFERED ENCRYPTION/DECRYPTION

DESCRIPTION

1. Technical Field

This invention relates generally to systems and methods for encrypting and decrypting digitally represented data streams and, more particularly, to a system and method utilizing buffering to increase the throughput of data communications when encryption and decryption is utilized.

2. Background Art

Techniques for encrypting and decrypting digitally represented data are well known in the prior art and are generally used to prevent the unauthorized access of data. These techniques are most commonly used in situations in which data must be communicated from one point to another. Classically, such a situation may be one in which data must be transmitted over a communications link from a transmitting station to a receiving station, which stations are separated by a substantial distance. However, encryption and decryption may also be used when security is a concern in the transfer of data from a central processing unit to a relatively remote unit, such as a disk storage device.

The process of taking data to be encrypted, which will hereinafter be referred to as plaintext, and transforming this data into an unrecognizable form, which will hereinafter be referred to as ciphertext, can seriously impact data processing system performance. Simply stated, it takes time to encrypt plaintext into ciphertext and more time to decrypt ciphertext back into plaintext. When data requiring encryption and decryption is communicated frequently, the capability of the encryption and decryption hardware and/or software can be easily saturated.

Many systems and techniques for encrypting and decrypting data are taught in the prior art. One example is shown in U.S. Pat. No. 4,642,424. FIG. 3 of that patent illustrates an encryptor used in the system described by that patent. Within the encryptor hardware a pair of registers is shown, as well as a pair of logic gates through which data or control signals are conveyed. While such an encryptor (and corresponding decryptor) may be relatively efficient, in terms of minimizing delays and maximizing throughput, those skilled in the art will understand that the hardware delays inherent in such systems can be substantial, especially as the number of registers and stages within the system, through which the data and other control signals must pass, increases.

In stream cipher operations, such as those described in U.S. Pat. No. 4,471,164 and in the text by Karl H. Meyer and Stephen M. Matyas, *Cryptography: A New Dimension in Computer Data Security*, pp. 53–61, John Wiley & Sons (1982), the unencrypted plaintext is combined through some mathematical operation with a secret sequence of data bits, known as the cryptographic bit stream, to produce ciphertext. When the ciphertext is received, it is similarly, mathematically operated upon with a cryptographic bit stream to reproduce the plaintext. For a specific example, the same secret cryptographic bit stream may be used at both transmitting and receiving ends and the mathematical operation may be that of EXCLUSIVE-ORing the plaintext and the cryptographic bit stream to produce the ciphertext at the transmitter and then, again, EXCLUSIVE-ORing the ciphertext and the cryptographic bit stream at the receiving end to reproduce the plaintext.

With such stream cipher systems, the generation of the cryptographic bit stream is typically accomplished by use of a key and a particular algorithm which takes the key and generates the same stream of data bits each time the key is used. Thus, use of the key and the cryptographic bit stream generating algorithm at both the transmitting end and the receiving end yields identical cryptographic bit streams at both ends for use in the encryption and decryption process. Probably the greatest impact to real time, secure transfers of data using such a process is the fact that the generation of the cryptographic bit streams with the algorithms and keys is a time consuming process which has been accomplished in real time in prior art systems while data was held up for encrypting prior to transmission and for decrypting upon reception.

The process of generating the stream cryptographic bit stream, with this inherent delay, can be improved by using a simpler or less sophisticated algorithm with the key; however, while this may improve performance, security may be compromised in that the cryptographic bit stream may be more easily duplicated by unauthorized persons seeking access to the data.

Another approach for improving this throughput problem involves the use of higher performance processing or computing capability in generating the cryptographic bit stream with the key and the algorithm. That is, with faster computing capability, the real time generation of the cryptographic bit stream from the algorithm and key is accomplished with greater speed and, therefore, less delay. However, this solution poses an obvious impact in costs, since it usually requires a jump from the utilization of one processor to another processor in a higher performance family of processors. The cost of this hardware difference may be an order of magnitude.

It would, therefore, be of great benefit to achieve a substantial improvement in the throughput of enciphering and deciphering data without compromising its security or substantially increasing the hardware costs associated with these enciphering and deciphering operations.

SUMMARY OF THE INVENTION

Accordingly, in contrast with the obvious drawbacks of the aforementioned delays inherent in enciphering and deciphering hardware due to the temporary storage of data in, or passage of data through, registers and gates, respectively, this invention advantageously utilizes buffering in both the encryption and decryption processes by generation of the cryptographic bit streams in advance of their needs by the system and storing these cryptographic bit streams in buffers until they are needed, whereupon the cryptographic bit streams are instantly available for combination with the plaintext (at the transmitter) and ciphertext (at the receiver) for encryption and decryption, respectively.

An encryption mechanism, such as a processor programmed in accordance with an appropriate algorithm, has applied thereto an encryption or decryption key and initializing values. The encryption mechanism generates a cryptographic bit stream which is an intermediate stream of generated values. This intermediate stream is then stored in a buffer until plaintext data is presented for encrypted transmission, at which time the series of bits of the cryptographic bit stream are conveyed from the buffer to a mathematical function, for combination with the plaintext, to produce the ciphertext which is transmitted to the receiver.

At the receiver a similar process has taken place in advance of reception of the ciphertext. That is, as described for the transmitting end, an encryption mechanism has applied thereto initializing values and a decryption key to generate the intermediate cryptographic bit stream of values which are, likewise, held in a buffer until needed for deciphering received ciphertext. The previously prepared and stored cryptographic bit stream is mathematically combined with the received ciphertext to reproduce the plaintext originally presented to the transmitter for encryption. Appropriate synchronization of the generation and buffer storage of the cryptographic bit streams at the transmitter and receiver is provided herein.

The foregoing and other objects, features, extensions, and advantages of the invention will be apparent from the following more particular description of preferred embodiments of the invention as illustrated in the accompanying drawings.

DETAILED DESCRIPTION OF THE PREFERRED EMBODIMENT

Figure 1:
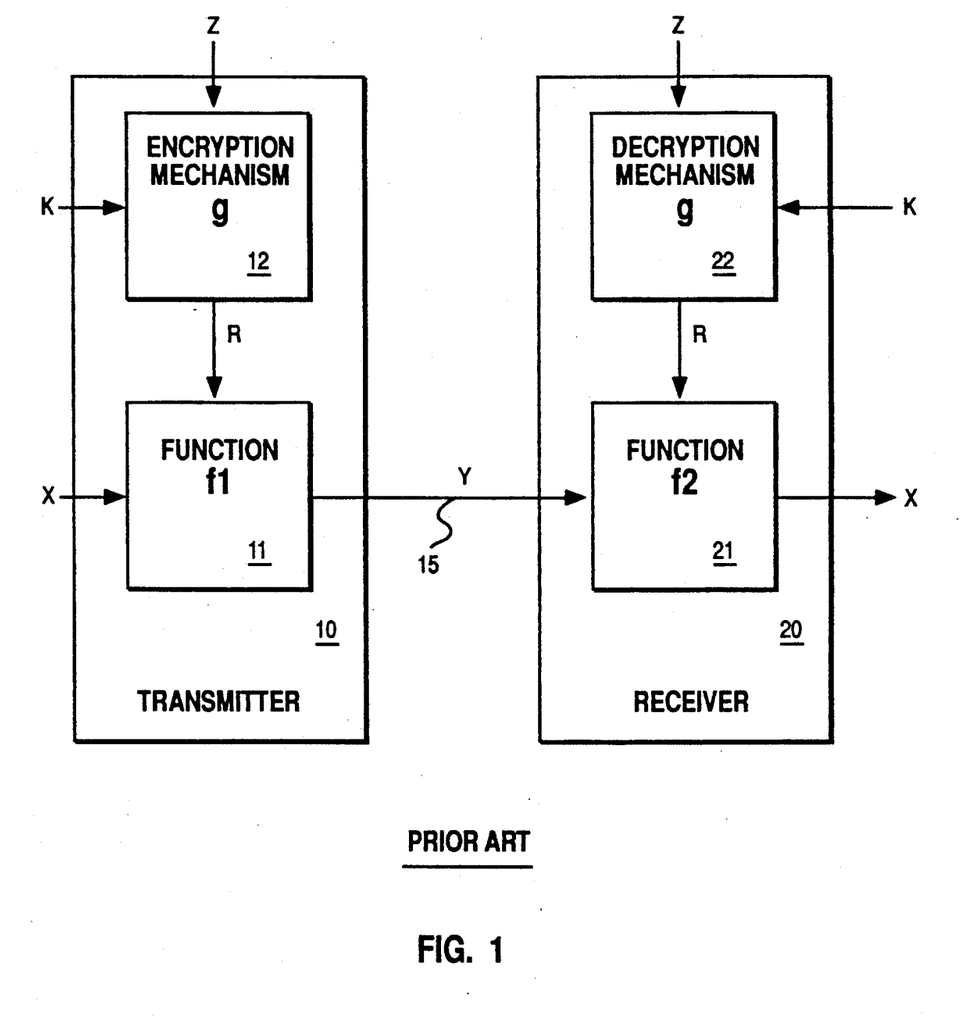
FIG. 1 is a block diagram of a typical stream cipher communication system including encryption at the transmitter and decryption at the receiver.

Beginning with reference to the block diagram of FIG. 1, a secure, stream cipher communication system is shown, as is taught in the prior art by the aforementioned U.S. Pat. No. 4,471,164 and Meyer et al text. In this drawing figure X represents a message in plaintext consisting of a sequence of data $X_0, X_1, \ldots$ that may be individual bits or uniform groups of bits, e.g., bytes. The term "word" may be hereinafter used to refer to one of these bits or groups of bits. The plaintext message X is applied to a function f1 which is represented by block 11 within the transmitter 10. As shown at block 12, the cryptographic bit stream R of generated values $R_0, R_1, \ldots$, which are also individual bits or uniform groups of bits, is generated by an encryption mechanism g as initialized by the series Z of initializing values and with the encryption key K. As in prior art systems, the transformation of the plaintext message X to a ciphertext, encrypted message Y at block 11 takes places by the real time generation, a word at a time, of the cryptographic bit stream R by the encryption mechanism g of block 12.

The ciphertext message is conveyed along a communications link 15 to a function f2 depicted as block 21 within a receiver 20. An encryption mechanism g, depicted by block 22, receives a decryption key K and initializing values Z, as in block 12 of the transmitter 10, to produce, in real time, a cryptographic bit stream R of values to be combined with the ciphertext message Y at block 21 to reproduce the plaintext message X output from the receiver 20.

Reviewing the throughput problem associated with the system shown in FIG. 1, the cryptographic bit stream R, being generated in real time, require significant amounts of time for their generation, such that the cryptographic bit stream R may, at both the transmitter and receiver, be generated at a slower rate than the plaintext message X is applied to block 11 of the transmitter and as the ciphertext message Y is applied to block 21 of the receiver. Those skilled in the art will understand that in this real time generation of the cryptographic bit stream R, any additional gating circuitry and registers utilized in the generation of R will tend to add additional delays in its generation.

Figure 2:
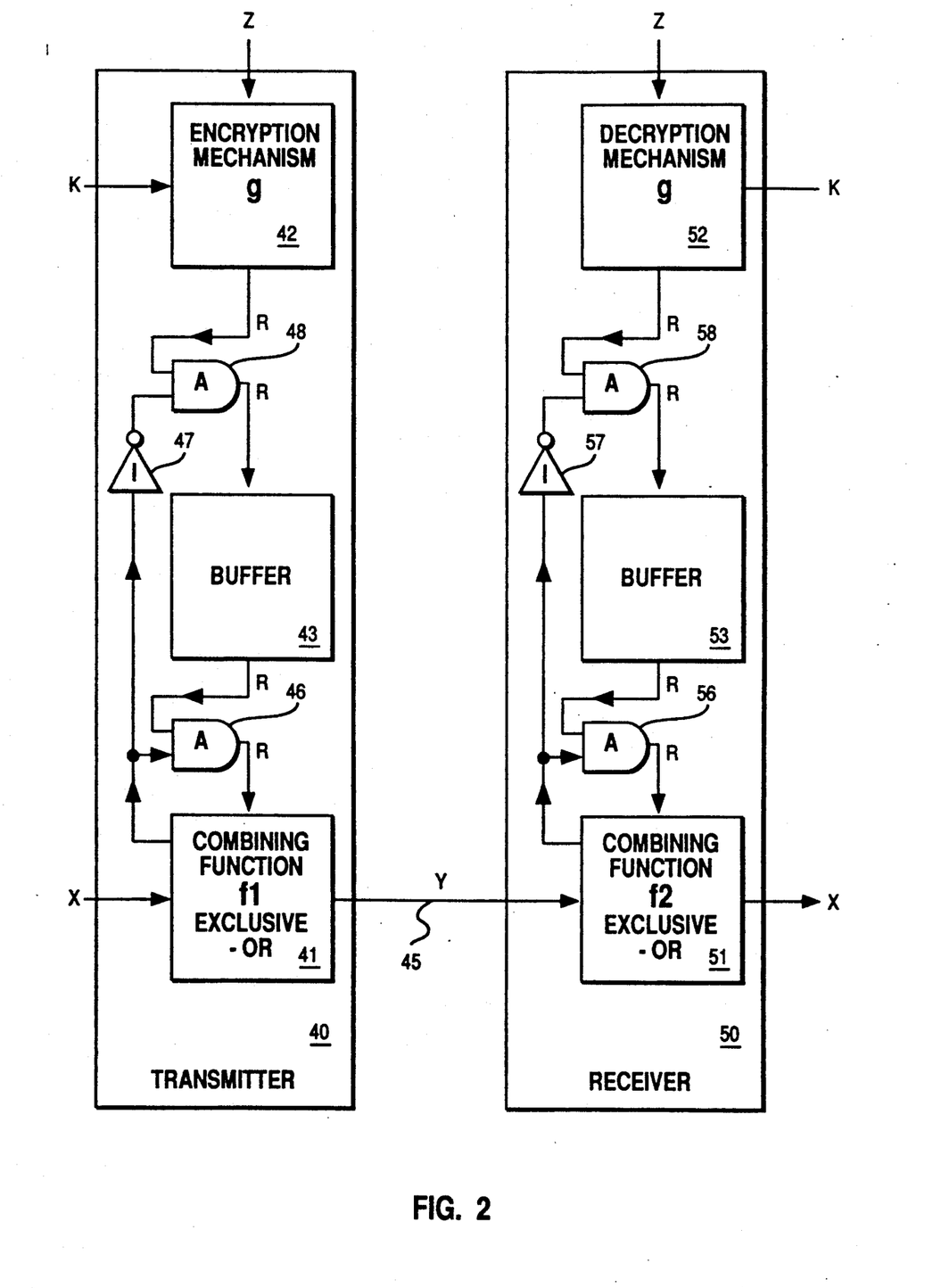
FIG. 2 is a block diagram of a stream cipher communication system including buffering of the cryptographic bit streams before encryption and decryption, according to this invention.

Reference is now made to FIG. 2 wherein a modified stream cipher system of this invention is shown, which includes pregeneration of the cryptographic bit streams and storage thereof in buffers until needed by the mathematical combining functions for encryption and decryption.

In FIG. 2, as in FIG. 1, the plaintext message X is applied to a mathematical function f1, as shown by block 41, to which is applied a cryptographic bit stream R for combination therewith to produce the ciphertext message Y that is conveyed to a similar block 51 in the receiver 50. The encryption mechanism g, shown as block 42 in the receiver 40, and the decryption mechanism g, shown as block 52 in the receiver 50, function identically to the encryption and decryption mechanisms shown as blocks 12 and 22, respectively, in FIG. 1. The striking difference between the systems shown in FIG. 1 and FIG. 2 is in the use of buffers 43 and 53 and in pregenerating the cryptographic bit streams R in both the transmitter and receiver and in storing these cryptographic bit streams in the buffers 43 and 53 so that the cryptographic bit streams are available for immediate use by blocks 41 and 51 upon receipt of plaintext and ciphertext, respectively.

In FIG. 2, AND gates 46 and 56 are enabled by the combining functions 41 and 51, respectively, to pass the cryptographic bit streams R from buffers 43 and 53, respectively, to the combining functions 41 and 51, respectively. AND gates 48 and 58 are enabled by the combining functions 41 and 51, respectively, through the inverters 47 and 57, respectively, to pass the cryptographic bit streams R from the encryption and decryption mechanisms 42 and 52, respectively, to the buffers 43 and 53, respectively. Those skilled in the art will appreciate that this configuration of AND gates and inverters inhibits removing the contents of the buffers during the loading thereof and inhibits loading of the buffers while the contents are being removed therefrom.

The process for pregenerating and managing the cryptographic bit streams in buffers 43 and 53 is described with reference to FIG. 3, while the processes for using the buffered cryptographic bit streams are described in FIG. 4 for the transmitter 40 and in FIG. 5 for the receiver 50.

Figure 3:
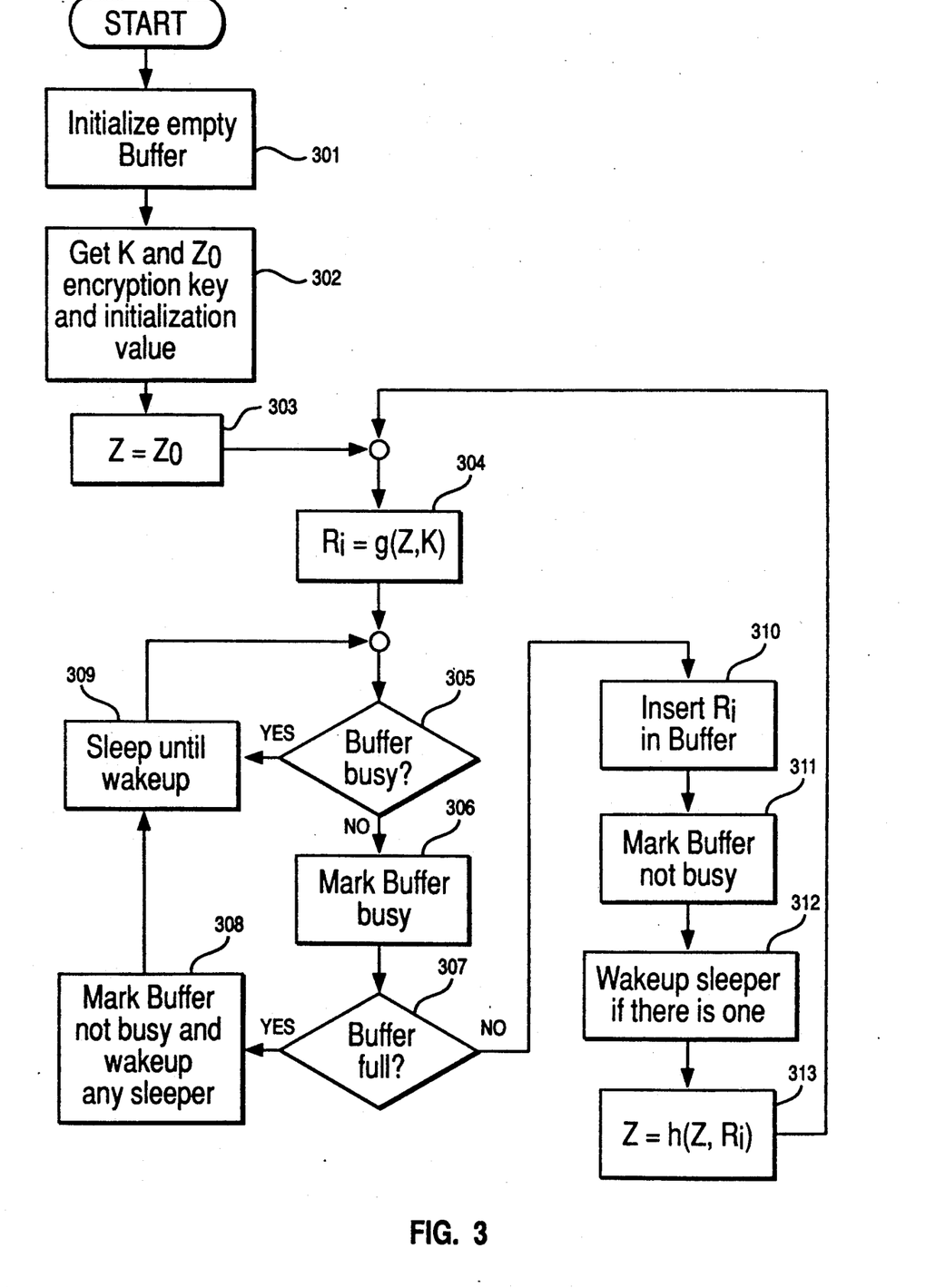
FIG. 3 is a flow diagram of the buffer management process.
Figure 4:
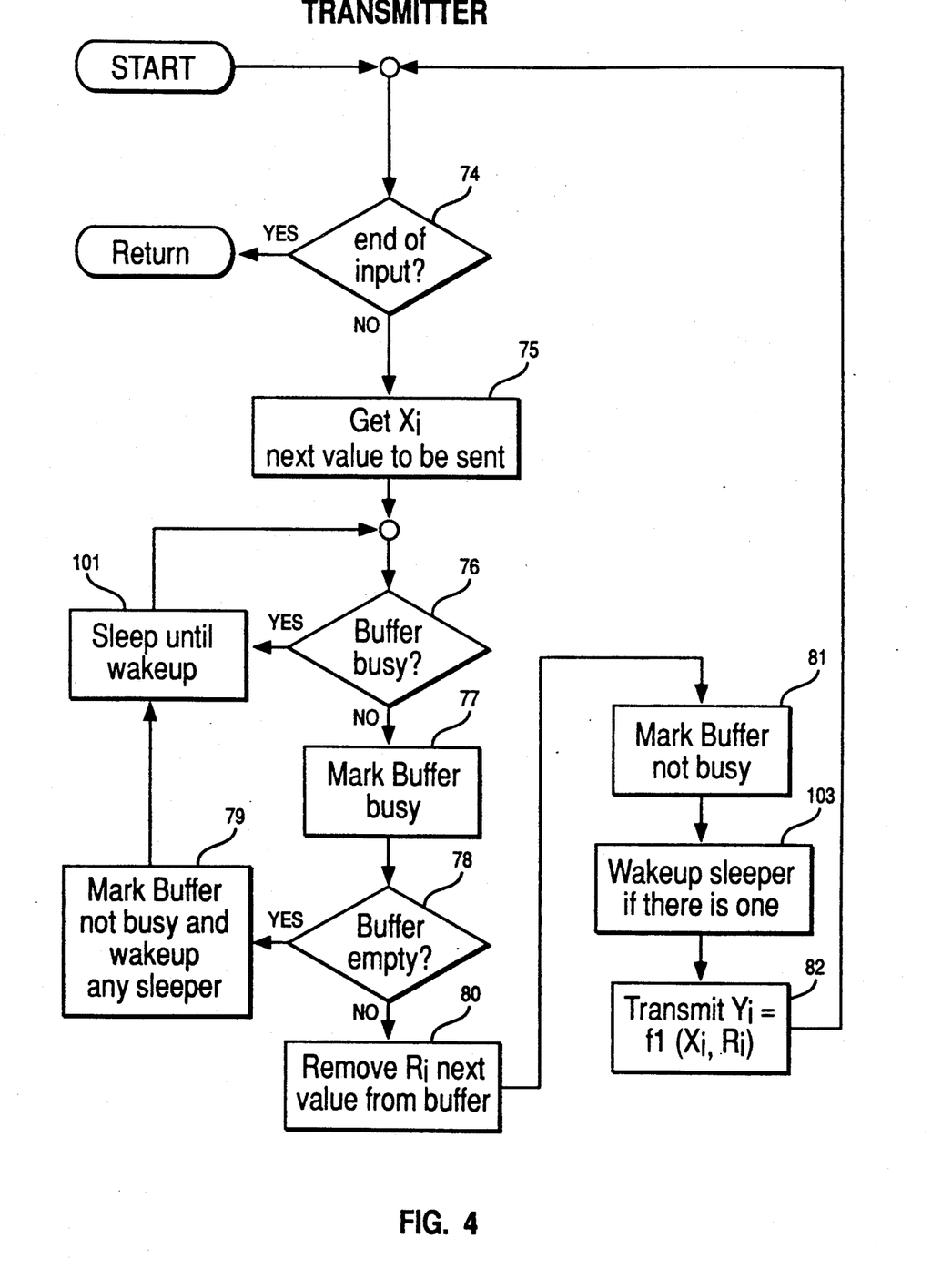
FIG. 4 is a flow diagram showing utilization of the buffered cryptographic bit stream at the transmitter.

Note that two separate, but identical instances of the process described in FIG. 3 exist. One performs buffer management for the transmitter described in FIG. 4 and one performs buffer management for the receiver described in FIG. 5. Referring now to FIG. 3, at the beginning of the buffer management process the buffer 43, in the case where the buffer management is for the transmitter, and the buffer 53, in the case where the buffer management is for the receiver, are initialized at 301 by clearing the buffers of all previous entries. At 302K, the secret encryption key, and Z0, the initialization value, are obtained. K will be used by the encryption mechanisms 12 and 22 to generate the cryptographic bit stream R, as set forth below.

At 303 the variable Z is initialized with the value Z0. At 304 the key K and the current value of Z is used to generate a word, Ri, of the cryptographic bit stream R. At 305 a test is made to determine if the buffer 43, in the case of buffer management for the transmitter, or the buffer 53, in the buffer management for the receiver, are in use. Use of the buffer at this point would indicate that its contents were being utilized for combination with a plaintext value at block 41 or with a ciphertext value at block 51. If the buffer is in use, the process sleeps at 309 until such time that the process is awakened by the process described in FIG. 4, in the case of buffer management for the transmitter, or by the process described in FIG. 5, in the case of buffer management for the receiver. When awakened the process loops back to the test at 305. When the buffer is found to be not in use, processing continues at 306 where a flag is set to indicate that the buffer is now in use by this buffer management process.

At 307 the buffer is examined to determine if it is full, and if so at 308 the flag set at 306 is reset and any other process, the transmitter in the case of buffer management for the transmitter and the receiver in the case of buffer management for the receiver, is awakened if it was sleeping. Processing then proceeds to 309 where the buffer management process sleeps. In the case that the test at 307 indicates that the buffer is not full, processing continues at 310 where the value of the cryptographic bit stream R, generated at 304, is inserted into the buffer. The flag set at 306 is reset at 311. At 312 any other process, the transmitter in the case of buffer management for the transmitter and the receiver in the case of buffer management for the receiver, is awakened if it was sleeping. At 313 a new value of Z is computed, using some function h applied to the current value of Z and Ri.

The following programming design language listing is another form of the description of the above process of pregenerating and managing the cryptographic bit streams in buffers 43 and 53. This listing parallels the operation described above for FIG. 3.

```
initialize buffer to empty
get K the encryption key
get Z0 the initializer
Z = Z0
loop forever
    R = g(Z,K)
        -- g is the encryption function
    repeat
        while buffer is busy
            sleep
        mark buffer busy
        if buffer is full
            mark buffer not busy
            wake up sleeper
            sleep
            bufferok = false
        else
            bufferok = true
    until bufferok
    insert R into buffer
    mark buffer not busy
    wake up sleeper
```

```
    Z = h(Z,R)
end loop
```

The utilization of the cryptographic bit stream R stored in buffer 43 of the transmitter 40 is now described with reference to FIG. 4. At 74 a test is made to determine if there is additional information to be transmitted. If so, processing continues at 75. At 75 a plaintext value X to be encrypted and transferred along the communications link 45 is obtained. At 76 a test is made to determine if the buffer 43 is busy. If so, the operation sleeps at 101 until such time as it is awakened because buffer 43 may no longer be busy. When buffer 43 is not busy, a flag is set at 77 to indicate that the buffer is now busy with the transmit encryption process. At 78 a test is made to determine if buffer 43 is empty. If buffer 43 is empty, the buffer is then marked not busy at 79 which allows the process described in FIG. 3 to obtain control of the buffer to add additional words of the cryptographic bit stream thereto; furthermore, at 79 the process described for FIG. 3 is awakened in case it is sleeping. From 79 the operation then sleeps at 101 until awakened because buffer 43 may no longer be empty.

Assuming at 78 that the buffer 43 is not empty, at 80 the next word of the cryptographic bit stream R is removed from the buffer. At 81 the flag set at 77 is reset so that the buffer is now marked not busy. At 103 the process described for FIG. 3 is awakened if it was sleeping because the buffer was either busy or full. At 82 the mathematical operation f1 at block 41 is applied to one word, X, of the plaintext and the word, R, removed at 80 to obtain a word of the ciphertext Y. At 83 the word of the ciphertext Y is sent along the communications link 45 to the receiver 50, whereupon operation of this process returns to the start thereof.

The following programming design language listing is another form of the description of the above process for using the buffered cryptographic bit streams in the transmitter 40. This listing parallels the operation described above for FIG. 4.

```
while not end of input do
    get X /* next value to send */
    repeat
        while buffer is busy
            sleep
        mark buffer busy
        if buffer is empty
            mark buffer not busy
            wake up sleeper
            sleep
            bufferok = false
        else
            bufferok = true
    until bufferok
    remove R from buffer
    mark buffer not busy
    wake up sleeper
    Y = f1(Y, R)
    transmit Y
end while
```

Figure 5:
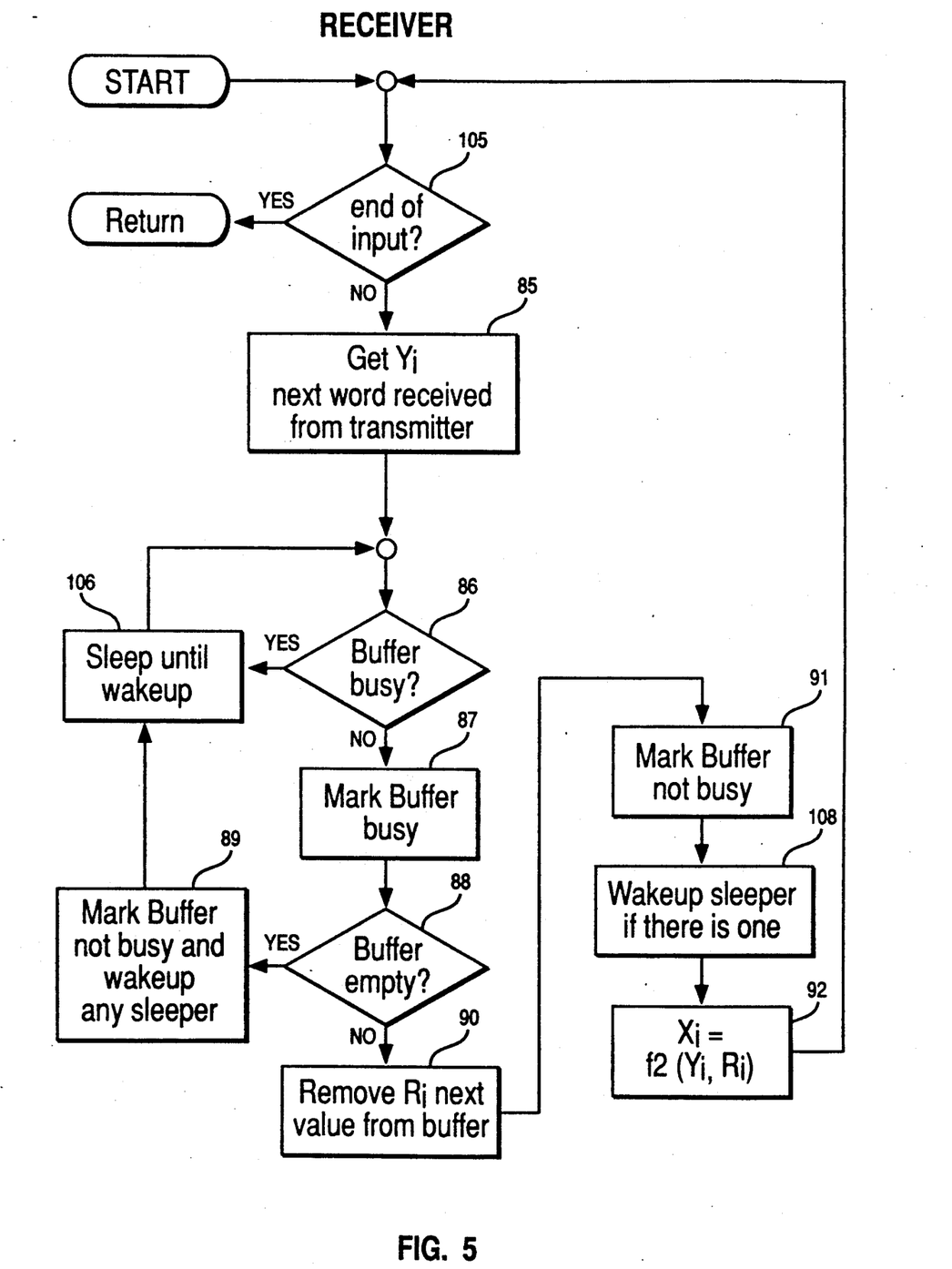
FIG. 5 is a flow diagram showing utilization of the buffered cryptographic bit stream at the receiver.

FIG. 5 shows the complimentary process at the receiver 50. In FIG. 5, at 105 a test is performed to determine if there is additional input to be processed. If so, processing continues at 85. At 85 a ciphertext value Y which was received along the communications link 45 is obtained for decryption. At 86 a test is made to determine if the buffer 53 is busy. If so, the operation sleeps at 106 until such time as it is awakened because buffer 53 may no longer be busy. When buffer 53 is not busy, a flag is set at 87 to indicate that the buffer is now busy with the receive encryption process. At 88 a test is made to determine if buffer 53 is empty. If buffer 53 is empty, the buffer is then marked not busy at 89 which allows the process described in FIG. 3 to obtain control of the buffer to add additional words of the cryptographic bit stream thereto; furthermore, at 89 the process described for FIG. 3 is awakened in case it is sleeping. From 89 the operation then sleeps at 106 until awakened by the process described for FIG. 3 because the buffer is no longer empty.

Assuming at 88 that the buffer 53 is not empty, at 90 the next word of the cryptographic bit stream, R, is removed from the buffer. At 91 the flag set at 87 is reset so that the buffer is now marked not busy. At 108 the process described for FIG. 3 is awakened if it was sleeping because the buffer was either busy or full. At 92 the mathematical operation f2 at block 51 is applied to one word, Y, of the ciphertext and the word, Ri, removed at 90 to obtain a word of the plaintext X.

The following programming design language listing is another form of the description of the above process for using the buffered cryptographic bit streams in the receiver 50. This listing parallels the operation described above for FIG. 5.

```
while not end of input do
        get Y /* next value received */
        repeat
                while buffer is busy
                        sleep
                mark buffer busy
                if buffer is empty
                        mark buffer not busy
                        wake up sleeper
                        sleep
                        bufferok = false
                else
                        bufferok = true
        until bufferok
        remove next value R from buffer
        mark buffer not busy
        wake up sleeper
        X = f2(Y, R) /* plaintext result */
end while
```

The particular mathematical functions f1 and f2 may be the EXCLUSIVE-OR function. In this case the cryptographic bit stream R in both the transmitter 40 and the receiver 50 are identical security is maintained by maintaining secrecy of the identical key K at both the transmitter 40 and the receiver 50.

It will, therefore, be understood that in contrast with the performance impacts suffered by the inherent delays encountered in passing the cryptographic bit stream R and signals utilized in the generation thereof through gates and registers during its real time generation, the present invention provides a substantial increase in throughput by the provision of buffers to store these cryptographic bit streams until they are actually used so that the generation thereof, which presents the greatest performance impact when accomplished in real time, is, in these embodiments, accomplished well in advance of its actual use.

While the invention has been shown and described with reference to particular embodiments thereof, it will be understood by those skilled in the art that the foregoing and other changes in form and details may be made therein without departing from the spirit and scope of the invention.

I claim:

1. A method for enciphering data in a data processing system, comprising: pregenerating, in advance of receipt of data to be enciphered, a cryptographic bit stream;

loading said cryptographic bit stream into a buffer upon said pregenerating said cryptographic bit stream;

removing a number of bits of said cryptographic bit stream from said buffer; and combining, after said buffering and asynchronously with respect to said pregenerating, said number of bits of said cryptographic bit stream with a number of bits of said data to be enciphered according to a mathematical function, said combining including controlling said buffer during said loading, to prevent said removing said bits of said cryptographic bit stream during said loading.

2. The method of claim 1 wherein said step of removing further comprises controlling said buffer during said removing, to prevent said loading of said cryptographic bit stream during said removing.

3. The method of claim 2 wherein said mathematical function is an EXCLUSIVE-OR function.

4. A method for deciphering data in a data processing system, comprising:

pregenerating, in advance of receipt of data to be deciphered, a cryptographic bit stream; loading said cryptographic bit stream into a buffer upon said pregenerating said cryptographic bit stream;

removing a number of bits of said cryptographic bit stream from said buffer; and combining, after said buffering and asynchronously with respect to said pregenerating, said number of bits of said cryptographic bit stream with a number of bits of said data to be deciphered according to a mathematical function, said combining including controlling said buffer during said loading, to prevent said removing said bits of said cryptographic bit stream during said loading.

5. The method of claim 4 wherein said step of removing further comprises controlling said buffer during said removing, to prevent said loading of said cryptographic bit stream during said removing.

6. The method of claim 5 wherein said mathematical function is an EXCLUSIVE-OR function.

7. A data processing system for enciphering data, comprising:

means for pregenerating, in advance of receipt of data to be enciphered, a cryptographic bit stream;

means for loading said cryptographic bit stream into a buffer upon operation of said means for pregenerating said cryptographic bit stream; means for removing a number of bits of said cryptographic bit stream from said buffer; and means for combining, after said buffering and asynchronously with respect to said pregenerating, said number of bits of said cryptographic bit stream with a number of bits of said data to be enciphered according to a mathematical function, said means for combining including means for controlling said buffer during said loading, to inhibit said means for removing said bits of said cryptographic bit steam during operation of said means for loading.

8. The system of claim 7 wherein said means for removing further comprises means for controlling said buffer during operation of said means for removing, to inhibit said means for loading said cryptographic bit stream during operation of said means for removing.

9. The system of claim 8 wherein said mathematical function is an EXCLUSIVE-OR function.

10. A data processing system for deciphering data, comprising:
   means for pregenerating, in advance of receipt of data to be deciphered, a cryptographic bit stream;
   means for loading said cryptographic bit stream into a buffer upon operation of said means for pregenerating said cryptographic bit stream; means for removing a number of bits of said cryptographic bit stream from said buffer; and
   means for combining, after said buffering and asynchronously with respect to said pregenerating, said number of bits of said cryptographic bit stream with a number of bits of said data to be deciphered according to a mathematical function, said means for combining including means for controlling said buffer during said loading, to inhibit said means for removing said bits of said cryptographic bit stream during operation of said means for loading.

11. The system of claim 10 wherein said means for removing further comprises means for controlling said buffer during operation of said means for removing, to inhibit said means for loading said cryptographic bit stream during operation of said means for removing.

12. The system of claim 11 wherein said mathematical function is an EXCLUSIVE-OR function.

* * * * *